United States Patent

Harde

[11] Patent Number: 5,115,830
[45] Date of Patent: May 26, 1992

[54] VALVE DEVICE, PARTICULARLY A VENTILATION VALVE FOR THE VENT PIPE OF A VEHICLE FUEL TANK

[75] Inventor: Bo Harde, Göteborg, Sweden
[73] Assignee: AB Volvo, Goteborg, Sweden
[21] Appl. No.: 678,344
[22] PCT Filed: Nov. 1, 1989
[86] PCT No.: PCT/SE89/00622
  § 371 Date: Apr. 25, 1991
  § 102(e) Date: Apr. 25, 1991
[87] PCT Pub. No.: WO90/05259
  PCT Pub. Date: May 17, 1990

[30] Foreign Application Priority Data

Nov. 2, 1988 [SE] Sweden .................. 8803983

[51] Int. Cl.⁵ ............................ F16K 17/36
[52] U.S. Cl. ........................... 137/39; 137/43; 137/202; 137/498
[58] Field of Search ............... 137/39, 43, 202, 498

[56] References Cited

U.S. PATENT DOCUMENTS

| | | | |
|---|---|---|---|
| 2,603,230 | 7/1952 | Krieger | 137/498 X |
| 3,765,435 | 10/1973 | Schlanzky | |
| 3,916,928 | 11/1975 | Enoch | 137/43 X |
| 3,970,098 | 7/1976 | Boswank et al. | |
| 3,996,951 | 12/1976 | Parr et al. | |
| 4,679,581 | 7/1987 | Mears | |

Primary Examiner—Robert G. Nilson
Attorney, Agent, or Firm—Young & Thompson

[57] ABSTRACT

Valve device, comprising a valve housing (1) with an inlet (3) and an outlet (5), a valve seat (13) and a valve closing member (8) movable in the housing between open and closed positions and having a sealing surface, which in the closed position of the valve closing member (8) is in contact with the valve seat to prevent liquid from flowing through the outlet. The valve closing member interacts with structure (15, 17) which, responsive to tilting of the valve housing relative to a predetermined position, moves the valve closing member to its closed position. The valve closing member being fixed to a float (11), which, as the liquid level rises in the housing (1) in its predetermined position, lifts the valve closing member towards its closed position, the weight of the structure (15, 17) being adapted to the lifting force of the float, so that the valve body, when the housing is filled with liquid and has been turned 180° from the predetermined position, is held in its closed position. The valve closing member (8) is coordinated with a movably mounted plunger element (17), which is disposed at a certain liquid flow through the inlet (3) to lift the valve closing member to its closed position. The plunger element (17) forms a seat (16) on which rests a ball (15), on which ball (15) the valve closing member (8) rests. The seat is formed so that the ball lifts the valve closing member towards the valve seat (13), when the valve housing (1) is tipped from its predetermined position.

4 Claims, 1 Drawing Sheet

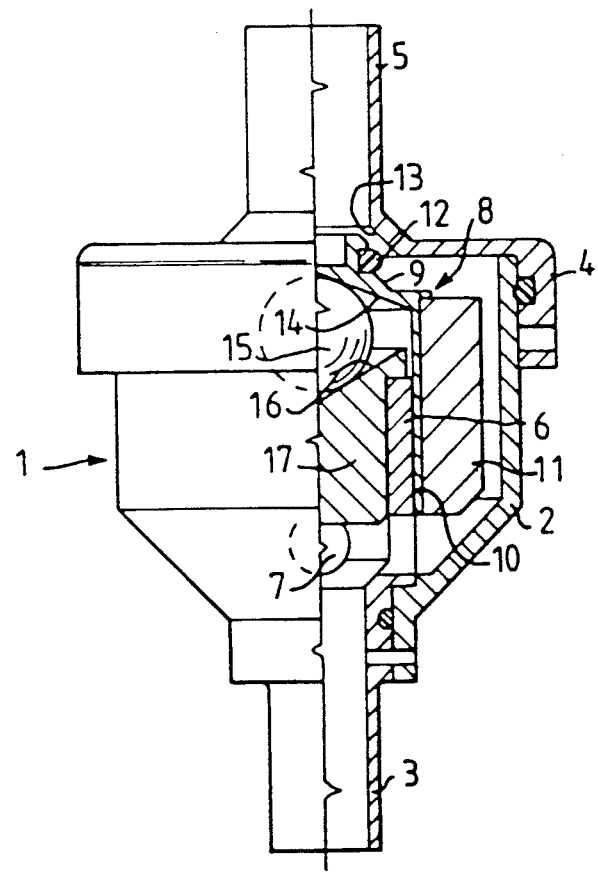

VALVE DEVICE, PARTICULARLY A VENTILATION VALVE FOR THE VENT PIPE OF A VEHICLE FUEL TANK

The present invention relates to a valve device comprising a valve housing with an inlet and an outlet, a valve seat and a valve closing member movable in said housing between open and closed positions and having a sealing surface, which in the closed positions of the valve closing member is in contact with the valve seat to prevent liquid from flowing through the outlet, said valve closing member interacting with said means which at a certain tilting of the valve housing, relative to a predetermined position, move the valve closing member to its closed position.

A valve of this type is used, for example, as a so-called "roll-over" valve in the vent pipe between a vehicle fuel tank and a filter with activated charcoal, which is designed to absorb gasoline fumes from the tank. The valve is designed to prevent liquid gasoline from reaching the filter should the inclination of the vehicle exceed 30°, for example, since liquid gasoline impairs the capacity of the charcoal to absorb gasoline fumes.

When filling the tank, some of the venting normally takes place via the gap between the gasoline pump nozzle and the tank fill pipe. If this gap is closed for the purpose of entirely preventing gasoline fumes from leaking out into the surrounding air, the entire volume of gas which is pressed out of the tank when it is filled with fuel must pass through the activated charcoal filter. Normally, when the tank is completely filled, the pump nozzle automatically shuts off the supply of fuel and prevent overfilling, but it is important that this automatic shut-off be effected quickly so that fuel does not rise in the vent pipe and reach the filter. If there is a seal between the nozzle spout and the tank fill pipe, then some form of safety device is required to protect against fuel penetrating to the filter. This protection can be in the form of a float operated valve in series with the "roll-over" valve.

The purpose of the present invention is to combine the function of the "roll-over" valve and the float operated valve in a single, simple and reliable valve.

This is achieved according to the invention in a valve device of the type described by way of introduction by virtue of the fact that the valve closing member is fixed to a float, which, as the liquid level rises in the housing in its predetermined position, lifts the valve closing member towards its closed position, and the weight of said means is adapted to the lifting force of the float, so that the valve body, when the housing is filled with liquid and has been turned 180° from the predetermined position, is held in its closed position.

If a float operated valve is turned upside down, the float will function in a way which is just the opposite to what was intended, i.e. with the float housing filled with liquid, the float will strive to keep the valve closing member from the valve seat. This means that if a car should turn over and come to rest upside down, the float would normally keep the valve open and allow gasoline to flow out through the vent pipe, but by adapting the components of the valve to each other in the manner stated above, the "roll-over" function will always predominate if the car should roll over.

When filling the tank with fuel, a mixture of air and fumes flows out from the tank via the vent pipe. As soon as the tank is full, fuel rises in the vent pipe. If the filling is done relatively slowly, the float follows the rising of the liquid level in the valve housing and the valve closes without any liquid having forces its way through the valve outlet. If, however, the tank is filled rapidly, there is a "pressure surge" in the fuel, when the tank has been filled, and the float cannot close the valve quickly enough to prevent a certain amount of fuel from passing through the valve and reaching the filter.

In order to make sure also that the valve closes when there is such a fuel pressure surge, according to a further development of the valve according to the invention, the valve closing member is coordinated with a movably mounted plunger element which is disposed, at a certain liquid flow through the inlet, to lift the valve closing member to the closed position.

The invention will be described in more detail with reference to an example shown in the accompanying drawing, which shows a partially cut-away side view of a combined float and "roll-over" valve.

In the FIGURE, 1 generally designates a valve housing, consisting of a lower housing portion 2 and an inlet stub 3, intended to be connected to a vent pipe from a fuel tank, and an upper housing portion 4 with an outlet stub 5, intended to be connected to a charcoal filter. The inlet stub 3 has a cylindrical extension 6 which extends into the housing portion 2 and has four evenly distributed openings 7, through which gas or liquid can flow into the valve housing. A valve closing member 8 consists of a disc-shaped sealing portion 9 and a cylindrical portion 10 extending downwards therefrom, which is vertically displaceable in the housing. The cylindrical portion 10 is guided by the cylindrical extension 6 and carries on its outer surface an annular float 11.

In the position shown, the valve is open, i.e. the valve closing member 8 is in a lower end position, in which a sealing ring 12 on the valve disc 9 is spaced from a conically shaped valve seat 13 in the housing portion 4. The underside of the valve disc 9, which is made with a conical depression 14, rests in this position on a ball 15, which in turn rests in a conical depression 16 in a plunger element 17, which is slideably mounted in the cylindrical extension 6. The plunger element 17 is a homogeneous metal body to provide a relatively heavy weight. It has an upper shoulder, which in the rest position shown rests on the upper edge of the cylinder 6.

With the movable components of the valve assuming the positions shown in the FIGURE, this occurring when the inlet 3 and the outlet 5 are vertically aligned and the valve housing is empty of liquid, gases can pass through the valve thus venting the fuel tank as it is filled. If fuel should penetrate into the valve housing, the valve closing element 8 will be lifted by the float 11, so that the sealing ring 12 of the valve disc will be pressed against the valve seat 13 thus closing the valve. This presupposes that the liquid level rises relatively slowly in the valve housing. If the fuel tank is filled rapidly, the fuel will surge through the vent pipe when the tank is completely filled. The openings 7 in the cylinder 6 serve in this case as constrictions and the plunger 17 will be subjected at its lower end surface to an upwardly directed force caused by a rapid pressure surge in the space below the plunger 17. This results in the plunger rapidly lifting the valve closing member 8 to a closed position. This process is substantially more rapid than closing by the effect of the float alone. When the valve has been closed and the pressure equalized on either side of the plunger due to the valve housing being filled with fuel, the plunger 17 returns to its starting position and the valve is kept closed by the float 11 as long as there if fuel in the valve housing.

When the valve housing 1 is tipped from its position shown, the ball 15 rolls out (up) towards the edge of the conical depression 16, thus lifting the valve closing member 8 towards the valve seat 13, whereby the valve is completely closed, for example when the angle of tilt exceeds 30°. By virtue of the fact that the valve disc 9 also has a conical depression 14 on its underside, against which surface the ball rolls, a double lifting height is obtained compared with the case with a valve disc with a flat underside.

If the valve is turned over 180° from the position shown, meaning that the car has come to rest upside down, the valve closing member 8 is loaded by the combined weight of the ball 15 and the plunger 17. Their masses are selected so that the float 11, under the influence of fuel flowing into the valve housing, is not able to lift the valve body from the closed position, i.e. the combined weight of the valve closing member 8, the ball 15 and the plunger 17 is greater than the lifting force of the float 11.

The plunger element 17 thus has a double function. It serves on one hand as an "emergency" valve closing device actuated by a pressure surge and, on the other hand, as a member whose weight helps to counteract the lifting force of the float 11 when the valve is turned upside down.

I claim:

1. Valve device, comprising a valve housing (1) with an inlet (3) and an outlet (5), a valve seat (13) and a valve closing member (8) movable in said housing between open and closed positions and having a sealing surface, which in the closed position of the valve closing member (8) is in contact with the valve seat to prevent liquid from flowing through the outlet, said valve closing member interacting with means (15, 17) which responsive to tilting of the valve housing, relative to a predetermined position, move the valve closing member to its closed position, said valve closing member being fixed to a float (11), which, as the liquid level rises in the housing (1) in its predetermined position, lifts the valve closing member towards its closed position, the weight of said means (15, 17) being adapted to the lifting force of the float, so that the valve body, when the housing is filled with liquid and has been turned 180° from the predetermined position, is held in its closed position, the valve closing member (8) being coordinated with a movably mounted plunger element (17), which is disposed at a certain liquid flow through the inlet (3) to lift the valve closing member to its closed position.

2. Valve device according to claim 1, characterized in that the plunger element (17) forms a seat (16) on which rests a ball (15), on which ball (15) the valve closing member (8) rests, and that said seat is formed so that the ball lifts the valve closing member towards the valve seat (13), when the valve housing (1) is tipped from its predetermined position.

3. Valve device according to claim 1, characterized in that a pipe stub (6) extending into the valve housing (1) forms a guide for the plunger element (17) and has at least one opening (7), through which gas or liquid can flow into the valve housing, the flow-through area of which is adapted to the effective area of the plunger element, that the plunger element is lifted towards the valve seat, when there is a certain inlet flow.

4. Valve device according to claim 1, characterized in that the seat of the ball (15) is formed by a conical depression (16) in an upward surface of the plunger element (17) and that the valve closing member (8) has on its side facing the ball a conical depression (14), into which the ball extends.

* * * * *